Dec. 22, 1953     W. M. DROUT, JR     2,663,679
EXTRACTIVE DISTILLATION OF ALCOHOLS OBTAINED FROM OLEFINS
Filed Dec. 31, 1948
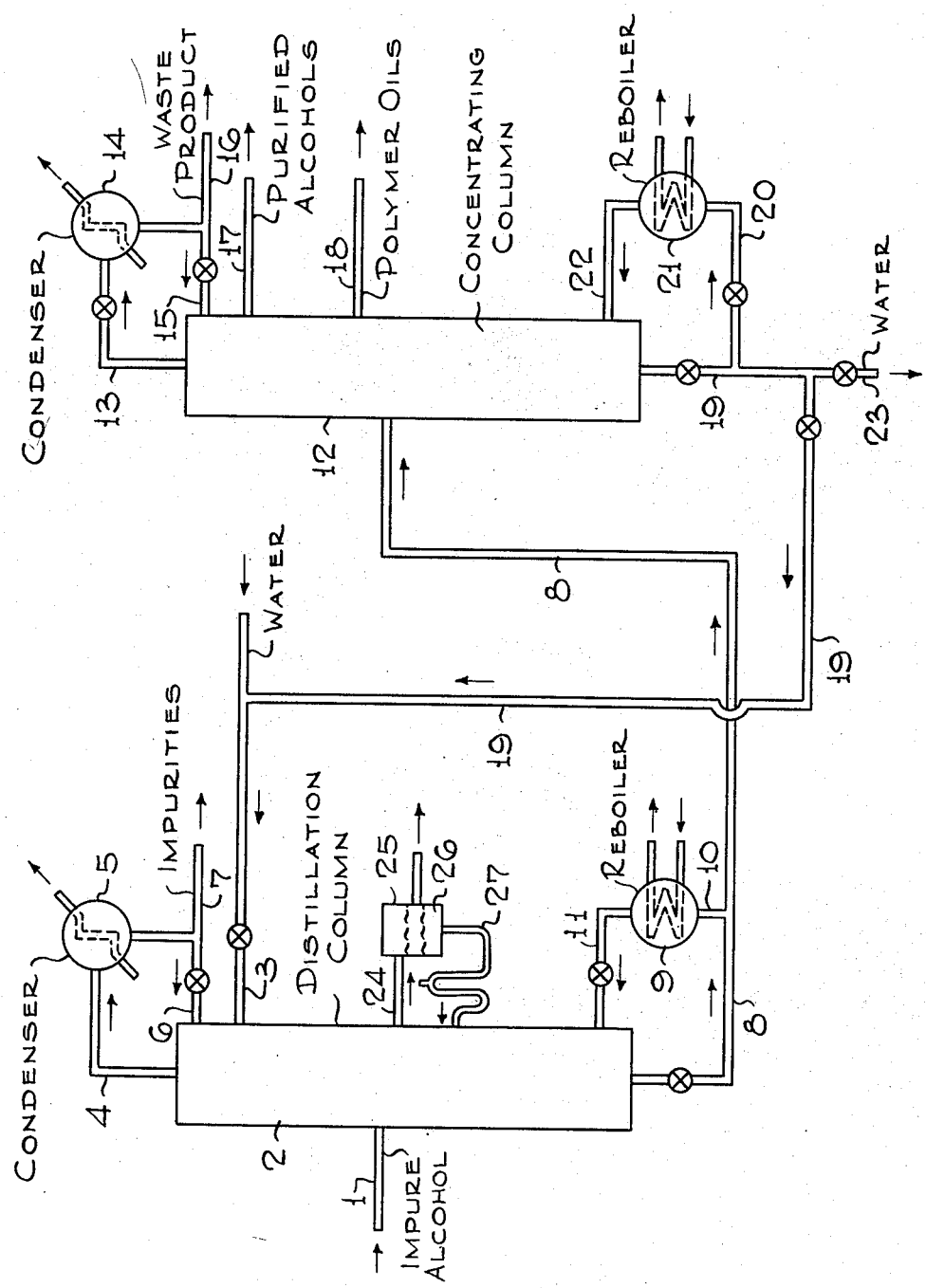
William M. Drout, Jr. Inventor
By Henry Berk Attorney Patented Dec. 22, 1953

2,663,679

UNITED STATES PATENT OFFICE 2,663,679

EXTRACTIVE DISTILLATION OF ALCOHOLS OBTAINED FROM OLEFINS

William M. Drout, Jr., Linden, N. J., assignor to Standard Oil Development Company, a corporation of Delaware Application December 31, 1948, Serial No. 68,453

4 Claims. (Cl. 202—39.5)

This application is a continuation-in-part of U. S. patent application Serial No. 24,626 filed May 1, 1948, now Patent 2,638,440, granted May 12, 1953.

This invention relates to the purification of organic liquids and vapors. More specifically the invention relates to an improved extractive distillation process for the purification of organic liquids and vapors. In particular the invention is concerned with the purification of organic liquids by extractive distillation in which the distillation is carried out without the conventional external reflux so that vapors are removed from the distillation column without further condensation above the point of entry of the extractive distillation solvent.

The invention has wide application and may be employed in extractive distillation operations to accomplish among others the following separations: an alcohol from impurities boiling over a wide-range; one or more alcohols from other close-boiling alcohols; alcohols from other oxygenated compounds such as ketones, aldehydes, esters, etc.; water from organic compounds such as alcohols, ketones, etc.; hydrocarbons from their isomers such as meta xylene from para xylene; paraffins from olefins, olefins from diolefins; etc. In each of the above mentioned applications the appropriate solvent suitable for the separation, e. g., water, aqueous salt solutions, acetone, hydrocarbon oils, aromatic ethers, etc., is employed during the extractive distillation process. However the process of this invention is applicable to extractive distillations of all types, i. e., regardless of the separation being made or the particular solvent employed.

It is an object of this invention therefore to provide a process for the purification of organic liquids by an improved extractive distillation process in which the customary external reflux is omitted so that vapors are removed from the distillation column without further condensation above the point of entry of the extractive distillation solvent.

It is another object of this invention to provide a novel and improved process for the purification of alcohols, particularly alcohols of 2 to 5 carbon atoms produced by the reaction of mono-olefins, by removing therefrom impurities both water-soluble and water-insoluble and odor-producing contaminants.

These and other objects of the invention are accomplished by subjecting the organic liquid to extractive distillation in a distillation zone in the presence of an extractive distillation solvent the nature, condition and amounts of which are determined by the purification being effected, and carrying out the distillation in the absence of conventional external reflux so that vapors are removed from the distillation zone without further condensation above the point of entry of the solvent.

Although the invention is applicable to the seperations listed above among others, it is particularly applicable to the purification of aliphatic alcohols especially those of 2 to 5 carbon atoms per molecule prepared from mono-olefins either by acid-catalysed hydration or by the so-called oxo-synthesis of an olefin with carbon monoxide followed by hydrogenation.

By the catalyzed hydration of olefins is meant those processes in which mono-olefins are hydrated in the presence of a catalyst, including the well known acid catalyzed processes wherein mono-olefins are hydrated in the presence of polybasic mineral acid-acting acids such as sulfuric acid, phosphoric acid, and benzenesulfonic acid; and also those processes, sometimes called direct hydration processes, in which the olefin is hydrated in the presence of solid catalysts such as phosphoric acid, phosphoric acid-tungsten oxide, etc. or dilute aqueous acids, such as sulfuric acid or phosphoric acid etc.

This invention will be described in its application to the purification of crude alcohols produced from mono-olefins but it is to be understood that the invention is not limited thereto since it has equal application to other extractive distillations regardless of the separations being effected.

By operating according to the terms of this invention high yields of highly refined alcohol of excellent odor characteristics can be produced for use in specialized industries, such as the cosmetic, perfume, drug, biological and vitamin industries. Heretofore, such alcohols were obtained only in very poor yields and at high cost by repeated refractionations of partially refined alcohols.

It is well known that alcohols produced by the sulfuric acid hydration of olefin hydrocarbons possess a distinct and apparent foreign odor, slightly penetrating and for the most part disagreeable. While no attempt will be made to definitely assign the disagreeable odor of alcohols prepared by this method to the presence of any one or combination of chemical compounds, it can be said with reasonable assurance that the odor of the crude alcohol depends to a large extent upon the quality of the starting material, viz., the olefin stream employed in the olefin hydration operation. Likewise, the odor of a refined alcohol depends to a large extent on the quality of the crude alcohol from which it is prepared.

Olefin hydrocarbons, such as those produced by the cracking of mineral oils, contain variable amounts of compounds having an obnoxious odor, particularly sulfur compounds such as hydrogen sulfide, alkyl sulfides, mercaptans, and products of sulfuric acid decomposition and reaction. These materials, present even in minute amounts in the olefin stream to the acid hydration process, are believed to contribute to the obnoxious odor of the crude alcohol. Although pure sulfur itself has no odor, it is clear that in combination with other elements it is a powerful odoriferous agent. The bad odor of alcohols has also been attributed to the presence of the so-called wide-boiling polymer products formed by side reactions during the acid catalyzed olefin hydration process. The odor of the polymer products is strengthened by the presence of any sulfur compounds dissolved therein, although the odor of some of the pure polymers themselves is by no means pleasing to the olfactory sense.

In order to show the number and diversity of the impurities present in alcohol resulting from catalyzed hydration processes, the following analysis is given for a sample of crude isopropanol produced by the sulfuric acid hydration of propylene, the proportions are based on an anhydrous alcohol basis:

Isopropanol, 90 volume percent.
Diisopropyl ether, 5–10 volume percent.
Up to 2 volume percent:
    Acetone.
    Hydrocarbons (B. P. 60–300° C. major portion 100–300° C.).
    Oxygenated compounds other than acetone incl. ethers, tertiary butyl alcohol and higher alcohols, higher ketones etc.
    Traces of sulfur compounds, boiling over a wide range.

A typical analysis of a sample of the polymer product, in this case the so-called "propyl oil" resulting from the production of isopropanol by the sulfuric acid hydration of propylene, is as follows:

55 weight percent secondary heptanol (B. P. 137–140° C.).
21 weight percent secondary octanol (B. P. 160–165° C.).
2 weight percent $C_7$ ketone (B. P. 131° C.).
13 weight percent hydrocarbons (B. P. above 60° up to about 300° C., chiefly polymers and copolymers of propylene).
9 weight percent ethers (B. P. above 100° C.) e. g. t-butyl isopropyl ether.
Traces of sulfur compounds.

The composition, odor and color of the propyl oil obtained during the concentration of dilute crude isopropanol resulting from the sulfuric acid catalyzed hydration of propylene vary according to the point from which the alcohol containing it, is withdrawn in the concentrating tower. Cuts have been identified ranging in color from a pale yellow to a deep red. Cuts have been identified with an odor of camphor, some of menthol odor, etc. It has also been reported that the presence of nitrogen compounds contribute to the odor of the alcohols.

In general aliphatic alcohols manufactured by the acid hydration of olefins contain, in the crude state, impurities which are peculiar to the hydration process, such as water, ethers, ketones, other alcohols, hydrocarbons, and the so-called polymer oils which are complex in nature as illustrated from the previously recited composition.

At the present time, commercial crude aqueous alcohols resulting from the acid hydration manufacturing processes, are purified as far as is economically feasible in the following manner. The crude aqueous alcohol is further diluted with water to throw out of solution a portion of the water insoluble impurities, including a substantial amount of the polymer oils. The layer of impurities is removed. The remaining aqueous alcohol is then subjected to distillation in a tower called the heads column, wherein some of the low boiling impurities, particularly ethers, are removed overhead. The bottoms from the heads column is sent to a concentrating column from which various streams are removed either overhead or as side streams. For example, in the isopropanol process, a so-called "butyl out" containing chiefly secondary butyl alcohol and water is removed at a point below the feed plate; a "propyl oil" cut is removed at a point above the feed plate; an overhead cut containing acetone is removed from the top of the tower, while the product itself, namely 91 volume per cent isopropanol is removed as a side stream at a point about five plates from the top of the tower. It is not possible to obtain an economical yield of refined alcohol that will pass the water dilution test and possess an excellent odor by conventional distillation of the undiluted crude alcohol containing the polymer oil in a 70 plate column.

According to the terms of this invention the crude aqueous alcohol mixture containing the impurities above described is subjected to a distillation operation in which the crude homogeneous alcohol solution is fed to a distillation tower at a point below the top, preferably at about the mid-point of the tower, and in which water is fed to the top of the tower or at a point near the top thereof in sufficient quantity to maintain a composition of 65–99.9 mol per cent in the liquid phase in the column. The operable water concentration as determined by the water solubility of the alcohol will vary with the crude alcohol mixture being purified, e. g. ethanol 65–99 mol per cent, preferably 80–99 mol per cent; isopropanol 70–99 mol per cent, preferably 85–99 mol per cent; sec-butanol 95–99.9 mol per cent; and sec-amyl alcohols 97.5–99.9%. Operation at elevated temperature and pressure greatly broadens the solubility range of secondary butanol and secondary amyl alcohol. For example, at 107° C. secondary butanol is completely miscible with water, and at 188° C. secondary amyl alcohol is completely miscible with water. Another method of enhancing the solubility of secondary butanol and sec-pentanol is the addition of low molecular weight oxygenated compounds, such as low molecular weight alcohols. In the case of sec-pentanol, acetone may be employed as a solubilizer.

The water thus supplied is sufficient to permit taking overhead all or substantially all of the impurities contained in the crude alcohol, namely, the ethers, ketones, other alcohols, light hydrocarbons some of which impurities boil as low as 30° C., and even all or a substantial portion of the high boiling polymer oils. The distillation tower is operated without the conventional external reflux so that vapors are removed overhead without further condensation above the point of entry of the extractive distillation solvent. Many of the impurities taken overhead boil normally at a temperature above the boiling point of the alcohol which is being purified, e. g. the polymer oils which boil as high as 250° C. to 300° C. Additional polymer oil impurity, particularly a portion of the higher boiling fractions thereof, concentrates in the column at a point near the alcohol feed plate upon contact of the crude alcohol feed with reflux water. This concentration of polymer oil occurs near the alcohol feed plate. A stream containing the polymer concentrate is removed from the distillation column at this point and the polymer removed therefrom by decantation. The dilute alcohol phase is returned to the column at a point about one plate below the withdrawal point. In this manner practically all the odor-producing contaminants are removed from the alcohol. The dilute aqueous alcohol product obtained as bottoms from the distillation zone and containing between 65-99 mol per cent water is led to a concentrating column, wherein the desired alcohol is concentrated and recovered in high yields. The product is far superior in odor to any alcohol obtained by any of the purification methods known to the art.

If desired, the crude aqueous alcohol may be treated prior to the extractive distillation step, with additional amounts of water to throw out of solution the bulk of the polymer oil, particularly the higher boiling constituents of the polymer oil.

It has been found that 95 volume per cent of the alcohol present in a crude aqueous isopropyl alcohol from the hydration of propylene having the following composition, can be recovered as high purity, excellent odor alcohol, by concentrating the weak alcohol recovered as bottoms from a 45 plate water extractive distillation column:

65 volume per cent isopropanol.
1.4 volume per cent propyl oil (based on alcohol content).
0.2 volume per cent acetone (based on alcohol content).
5.1 volume per cent isopropanol ether (based on alcohol content).
Balance—water and other impurities.

By operating the 45 plate extractive distillation column at a 2:1 reflux to heads ratio with the alcohol feed rate (alcohol feed to the 30th plate) and the water feed rate (water feed to the 45 plate) adjusted so that a 23.5 volume per cent alcohol was drawn off at the bottom of the column, it was possible to remove the following proportions of the feed components from the alcohol in the overhead from the column:

69.7 volume per cent propyl oil.
100 volume per cent acetone.
100 volume per cent isopropyl ether.
5.2 volume per cent isopropyl alcohol.

Although the overhead from the above distillation contained 5.2 volume per cent of the isopropyl alcohol fed to the column, it is possible by employing optimum distillation conditions to hold the alcohol content of the overhead to a much smaller amount, say 1 volume per cent or less. The weak 23.5 volume per cent aqueous alcohol recovered from the extractive distillation column was concentrated in a 40 plate batch distillation column.

The accompanying drawing represents a flow plan in elevation of one process and accompanying apparatus for carrying out this invention.

Referring to the drawing, numeral 2 represents an extractive distillation tower, such as a 45 plate column, to which crude isopropyl alcohol or partially refined isopropyl alcohol containing 0 to 60 volume per cent water is fed via line 1. The feed line is located at a point preferably above the midsection of the distillation column, for example, at about the 30th plate in a 45 plate tower. Water is fed to the tower in considerable amounts through line 3. The water is fed to the top or near the top of the tower but always above the alcohol feed plate. To obtain the desired separation of the impurities from the alcohol, the mixture is subjected to a continuous fractional distillation in column 2. The water introduced in sufficiently large quantity at the upper part of the tower effectively modifies the relative volatilities of the organic compounds being separated, and distillation of an extremely large part of the impurities from the alcohol is effected. The temperature of the water feed to the extractive distillation zone is preferably close to the temperature of the liquid on the water feed plate, although it may be lower to partially condense vapors ascending to the water feed plate. For continuous efficient operation, the water must be added continuously near the top of the column while the crude alcohol being purified is continuously fed into the column at a lower point and while sufficient heat is provided to afford distillation throughout the column. The feed stream may be preheated to a temperature close to that of the internal liquid reflux under equilibrium boiling conditions at the point of introduction. The preheated alcohol feed stream may be liquid, partially vaporized or completely vaporized when introduced into the fractionation column. Vapors of the organic compounds introduced as a feed stream pass upwardly through the distillation zone in contact with descending internal liquid reflux under equilibrium reboiling and refluxing conditions. Due to the fact that water, considerably in excess of the amount of water distilled, is introduced to mix with the condensate near the top of the distillation zone, the water concentration in the internal liquid reflux at the top of the distillation zone is higher than the water concentration in vapors passing up through the zone. Excellent results have been obtained by operating the column with pure water reflux without the return of an external condensate. Contrasted therewith in normal rectification of alcohols from an aqueous feed, the water concentration diminishes rapidly toward the limiting water concentration of the aqueous azeotropes in the vapors ascending the distillation column.

The quantity of water required to be introduced continuously at the upper part of the distillation zone for accomplishing the desired separation of the impurities from the alcohol is considerably greater than the quantity of condensate with which it becomes homogeneously mixed on each plate in order to make the water concentration of the internal reflux substantially above a critical minimum in the range of 70-99.9 mol per cent. With adequate water concentration in the internal reflux for effecting the separation, the alcohol to be isolated in the aqueous bottoms is dissolved in the aqueous internal reflux that reaches the bottom of the distillation column. Excellent quality isopropyl alcohol was obtained by adjusting the alcohol to water feed ratio so that 15–25 volume per cent alcohol was obtained from the bottom of the distillation column.

Returning to the drawing, impurities contained in the isopropyl alcohol, namely, isopropyl ether, acetone, a substantial part of the propyl oil, water, etc. are removed overhead via line 4, condensed in condenser 5 and removed from the system via line 7. Part of the condensate may be refluxed to the top of the column via line 6. However, it has been found that a further improvement in the quality of alcohol can be obtained without loss of alcohol yield by operating the extractive distillation column without the conventional reflux so that vapors are removed from the column without further condensation above the point of entry of the extractive distillation solvent. By operating without external reflux from the condenser, the extent of reflux in the tower 2 is controlled only by the condition and amount of the solvent entering the tower through line 3. Thus the solvent itself acts as a partial condenser when the temperature of the solvent is properly controlled. Omitting the external reflux, it has been found that there will still be an effective reflux in the tower because at the point of introduction of the solvent into the tower no equilibrium exists between the vapors and the solvent. As the solvent free of alcohol descends a few plates down the tower it picks up alcohol until it reaches a steady state condition. The result is the same as if refluxing of the desired pure alcohol had been achieved. It has been found that the reflux ratio can be effectively controlled between 0:1 and 10:1 by omitting the conventional external reflux and introducing the extractive distillation solvent into the tower at a temperature somewhat below its boiling-point, say in the case of water at a temperature of 20–95° C., preferably 85–95° C. If an extremely pure product is desired, e. g., practically 100% pure alcohol, it may be attained at the expense of a small loss of the alcohol overhead with the impurities being removed. To accomplish this, the solvent is introduced into the tower at a colder temperature, i. e., at a temperature nearer the lower level of the range expressed and no external reflux is employed. By operating in this manner one avoids having any of the impurites brought back down into the tower over the amount condensed on any one plate in the tower particularly between the feed plate and the point of introduction of the solvent.

Additional high boiling polymer oil has been found to concentrate as a separate phase in the column at a point near the alcohol feed plate when the feed is mixed with the aqueous reflux stream. A sidestream containing this polymer oil concentrate is removed from the column and the polymer oil is separated by continuous decantation, thus minimizing or virtually eliminating polymer oil from the concentrating column. This sidestream is removed from the column at a point below the crude alcohol feed plate, but preferably at a point immediately below the alcohol feed plate. To this end a stream can be removed from tower 2 via line 24 and sent to decanter 25. This stream is withdrawn at a point near the alcohol feed plate or slightly below the alcohol feed plate. In the decanter the stream separates into an upper polymer oil phase which is discarded, and a lower aqueous alcohol stream 26 freed of polymer oil. The latter is returned to the tower via line 27 at a point about a plate below the withdrawal point.

Bottoms from the tower 2, consisting chiefly of aqueous alcohol of about 10–40 volume per cent, preferably 15–25 volume per cent is removed via line 8 and introduced to concentrating column 12. Part of the aqueous bottoms is withdrawn from line 8 via line 10 and sent to reboiler 9 for heating by indirect or direct heat exchange with a heating medium, such as live steam, and returned via line 11 to the distillation column. In column 12 the aqueous alcohol is concentrated to the desired level up to the 91.3 volume per cent isopropyl alcohol-water azeotrope, which is removed as a sidestream near the top of the column via line 17. The remaining propyl oil, if any, contained in the aqueous alcohol is removed from the concentrating column in a sidestream 18 at a point about three plates above the feed plate. Some remaining traces of light material, if any, and alcohol are removed overhead via line 13, condensed in condenser 14 and removed from the system via line 16. If desired, this overhead may be recycled to the extractive distillation zone. Part of the condensate may be refluxed to the top of the column via line 15. Bottoms from the concentrating column consisting substantially of water are removed via line 19 and may be recycled in whole or in part to the extractive distillation tower 2 via water supply line 3. Excess water may be removed from the system via line 23. A portion of the aqueous bottoms may be withdrawn via line 20 and sent to reboiler 21 for heating by indirect or direct heat exchange with a heating medium such as live steam and recycled to column 12 via line 22. Although the dilute aqueous alcohol solution from the distillation zone has been described as concentrated by fractional distillation, other means of concentration may be employed, such as solvent extraction.

In the separation of impurities from isopropanol produced by the acid catalyzed hydration of propylene, essentially no satisfactory separation is effected if the internal reflux contains less than 70 mol per cent water. For obtaining satisfactory results on a practical scale the preferred range is 85–99 mol per cent water in the internal reflux.

Under steady conditions in the extractive distillation zone, the internal reflux, having adequate water concentration for accomplishing the separation of the wide-boiling impurities, tends to have a nearly constant water concentration in a preferably homogeneous liquid phase at each plate, and the high water concentration is approximately uniform in the internal reflux below the alcohol feed plate. This internal reflux in flowing from the top to the bottom of tower becomes richer in the alcohol while the other impurities of the feed become distilled overhead.

In the distillation process the mol per cent water in the total overhead from the extractive distillation column will vary with the operating conditions and with the nature of the impurities rejected overhead. The aqueous bottoms removed from the extractive distillation zone will contain approximately 70–99 mol per cent water. The overhead from the extractive distillation zone upon condensation and cooling frequently separates into two phases, an aqueous phase and an organic phase. An Engler distillation of a typical organic phase, resulting from the purification of isopropanol reveals that the initial boiling point lies between 40–50° C., and the final boiling point is approximately 250° C., indicating that there is considerable high boiling material contained in the overhead.

Without attempting to explain the mechanism by which the desired separation occurs in the distillation column, it can be said that the process is one of vapor-liquid extraction in which the vapors contain a greater relative concentration of the impurities than under the normal fractionation conditions in the absence of the considerable amount of water internal reflux. It is evident from the results obtained that the water employed within the limits specified, increases the effective vapor pressures of the impurities relative to the vapor pressure of the alcohol being purified, thus allowing the impurities to pass overhead from the distillation zone. Although it is preferable not to have any plates in the tower above the water feed plate, it is possible to carry out the separation with a limited number of plates above the water feed plate. However, this number should be held to a minimum.

Although the invention has been described employing pure water in the distillation process, it is also permissible in the purification of alcohols to use water containing a small amount of salts, such as sodium acetate, or acid, such as sulfuric acid or even caustic, such as sodium hydroxide.

Although the invention has been illustrated by the purification of isopropanol, it is equally applicable to the purification of other alcohols of 2 to 5 carbon atoms per molecule resulting from the reaction of mono-olefins, such as ethanol, tertiary butanol, secondary butanol, the secondary amyl alcohols, and tertiary amyl alcohol. In this regard the impurities are removed in a manner similar to that described for the isopropanol system. The following are approximate typical compositions of some of the crude aqueous alcohols which may be treated according to this purification process:

Crude ethyl alcohol

80–85 weight per cent ethyl alcohol.
9–14 weight per cent ethyl ether.
0.2–0.8 weight per cent hydrocarbons (B. P. 30–300° C.).
2.5–5 weight per cent colloidal carbon.

Crude secondary butyl alcohol 75 weight per cent butyl alcohol.
5 weight per cent secondary butyl ether.
4 weight per cent polymer oils.
Balance water and other impurities.

Crude secondary amyl alcohols 50 volume per cent sec-amyl alcohol.
20 volume per cent hydrocarbons.
5–10 volume per cent sec-butyl alcohol.
2–5 volume per cent tertiary amyl alcohol.
5–10 volume per cent water.
2–3 volume per cent ethers, e. g. sec-amyl, sec-butyl and mixed ethers.
2–5 volume per cent higher alcohols, e. g. hexyl alcohols.
1–2 volume per cent ketones, e. g. diethyl ketone or methyl propyl ketone.

As previously mentioned, the operating conditions will vary with the nature of the alcohol being purified. In this respect the amount of water added to the distillation column is important. When purifying secondary butanol, it has been found that sufficient water should be added to the distillation column to maintain a composition of 95–99.9 mol per cent water in the liquid phase in the column. For secondary amyl alcohols sufficient water should be added to maintain a composition of 97.5 to 99.9 mol per cent water in the liquid phase in the column.

Laboratory data obtained with a 45-plate column, with water being fed to the 45th plate and crude isopropanol to the 30th plate, are given in Table I. Confirmatory data obtained with a 30-plate commercial distillation column, with water being fed to the 29th plate and crude isopropanol to the 23rd plate, are given in Table II. The results show by comparison the advantages of operating without the conventional external reflux.

TABLE I
45 plate laboratory column

| Reflex ratio | Mol per cent $H_2O$ added | Temperature of $H_2O$ added (° C.) | Percent organic material ejected in heads | IPOH concentration (volume percent) in column bottoms | Percent IPOH yield | Optical density of product [1] | |
|---|---|---|---|---|---|---|---|
| | | | | | | 2,250 A° | 2,700 A° |
| 3:1 | 90.9 | 93–95 | 14.4 | 27.5 | 90.5 | 0.299 | 0.107 |
| 2:1 | 93.5 | 93–95 | 14.1 | 22.1 | 89.3 | 0.227 | 0.050 |
| 1:1 | 91.5 | 93–95 | 15.1 | 28.5 | 90.6 | 0.206 | 0.023 |
| 0 | 89.0 | 93–95 | 13.8 | 31.8 | 92.1 | 0.193 | 0.023 |
| 0 | 88.6 | 93–95 | 12.4 | 33.3 | 91.2 | 0.149 | 0.060 |

[1] Same as in Table II.

TABLE II
30 plate commercial distillation column

| Reflex ratio | Mol per cent $H_2O$ added | Temperature of $H_2O$ added (° C.) | Percent organic material ejected in heads | IPOH concentration (volume percent) in column bottoms | Percent IPOH yield | Optical density of product [1] | |
|---|---|---|---|---|---|---|---|
| | | | | | | 2,250 A° | 2,700 A° |
| 1.05:1 | 91.5 | 93–94 | 15 | 26.0 | 85 | 0.524 | 0.435 |
| 0.46:1 | 91.5 | 93–94 | 15 | 26.0 | 85 | 0.326 | 0.334 |
| 0 | 91.5 | 93–94 | 15 | 26.0 | 85 | 0.126 | 0.119 |

[1] In comparison with distilled water. Odor of alcohol increases with increasing optical density at these wave lengths.

In addition to the purification of aliphatic alcohols as outlined, the invention is also applicable to the following extractive distillation processes:

| Object of distillation | Extractive distillation solvent |
| --- | --- |
| Separation of close-boiling alcohols, e. g. IPOH (overhead) from ETOH (bottoms), i-BuOH (overhead) from n-BuOH (bottoms), etc. | $H_2O$ (50–99.9 mol percent, preferably 70–99 mol percent), higher alcohols, sulfolane, phenol, glycols, glycol ethers, esters, ether-esters, hydrocarbons, salts, etc. |
| Separation of alcohols (bottoms) from non-alcoholic oxygenated compounds (overhead). | $H_2O$ (50–99.9 mol percent, preferably 85–99 mol percent). |
| Dehydration of alcohols | Water immiscible alcohols, gasoline, etc. |
| Separation of acetone from neutral oxy compounds. | Water. |
| Separation of MEK from SBOH | Do. |
| Separation of aromatic hydrocarbon isomers or of different types of aromatic hydrocarbons. | Hydrotropic salts, e. g. sulfonates, etc. |
| Separation of paraffins from olefins, olefins from diolefins. | Acetone, furfural, etc. |

The process is applicable whether the desired component is being recovered overhead from the extractive distillation tower or whether it is recovered as a solution in the solvent at the bottom of the tower, since the purpose of the solvent is to improve the relative volatility (alpha) of the components regardless of the direction in which they are separated.

What is claimed is:

1. The method of refining a crude $C_2$—$C_5$ aliphatic alcohol produced by reaction of a monoolefin, said crude alcohol containing contaminants lower-boiling and higher-boiling than the alcohol, some of said higher boiling impurities being vaporized with water under distillation conditions hereinafter mentioned and some of said higher boiling impurities being non-vaporizable under said conditions, which comprises introducing the crude alcohol to a fractional distillation zone at an intermediate point thereof, introducing sufficient water at a temperature of 20–95° C. to the fractional distillation zone at a point substantially above the crude alcohol feed point to maintain an internal liquid reflux having a water content in the range of 65 to 99.9 mol per cent water below the point of addition of the water, distilling from said crude alcohol a vaporous mixture comprising water, the lower boiling impurities and the higher boiling impurities which vaporize with water under the distillation conditions wherein the vaporous mixture flows countercurrent to the internal aqueous liquid reflux, and removing said vaporous mixture overhead from the fractional distillation zone, removing a bottoms product from the distillation zone containing water, alcohol, and the higher boiling impurities which do not vaporize with water, said distillation being conducted without returning to the distillation zone the thus-distilled components of the overhead distillate.

2. The method of claim 1 in which the crude alcohol is ethanol and in which the water content of the internal liquid reflux is maintained in the range of 65 to 99 mol per cent.

3. The method of claim 1 in which the alcohol is isopropanol and in which the water content of the internal liquid reflux is maintained at 70 to 99 mol per cent.

4. The method of claim 1 in which the alcohol is secondary butanol and in which the water content of the internal liquid reflux is maintained at 95 to 99.9 mol per cent.

WILLIAM M. DROUT, JR.

References Cited in the file of this patent

UNITED STATES PATENTS

| Number | Name | Date |
| --- | --- | --- |
| 887,793 | Guillaume | May 19, 1908 |
| 996,328 | Guillaume | June 27, 1911 |
| 2,080,111 | Bump | May 11, 1937 |
| 2,179,991 | Bright et al. | Nov. 14, 1939 |
| 2,198,651 | Bludworth | Apr. 30, 1940 |
| 2,215,915 | Cope et al. | Sept. 24, 1940 |
| 2,283,911 | Brant et al. | May 26, 1942 |
| 2,290,442 | Metzl | July 21, 1942 |
| 2,290,636 | Deanesly | July 21, 1942 |
| 2,321,748 | Hopkins et al. | June 15, 1943 |
| 2,379,110 | Souders | June 26, 1945 |
| 2,551,593 | Gilliland et al. | May 8, 1951 |